Feb. 10, 1925.
D. F. LOGAN
1,525,455
TIRE BUILDING
Filed July 12, 1922
3 Sheets-Sheet 1
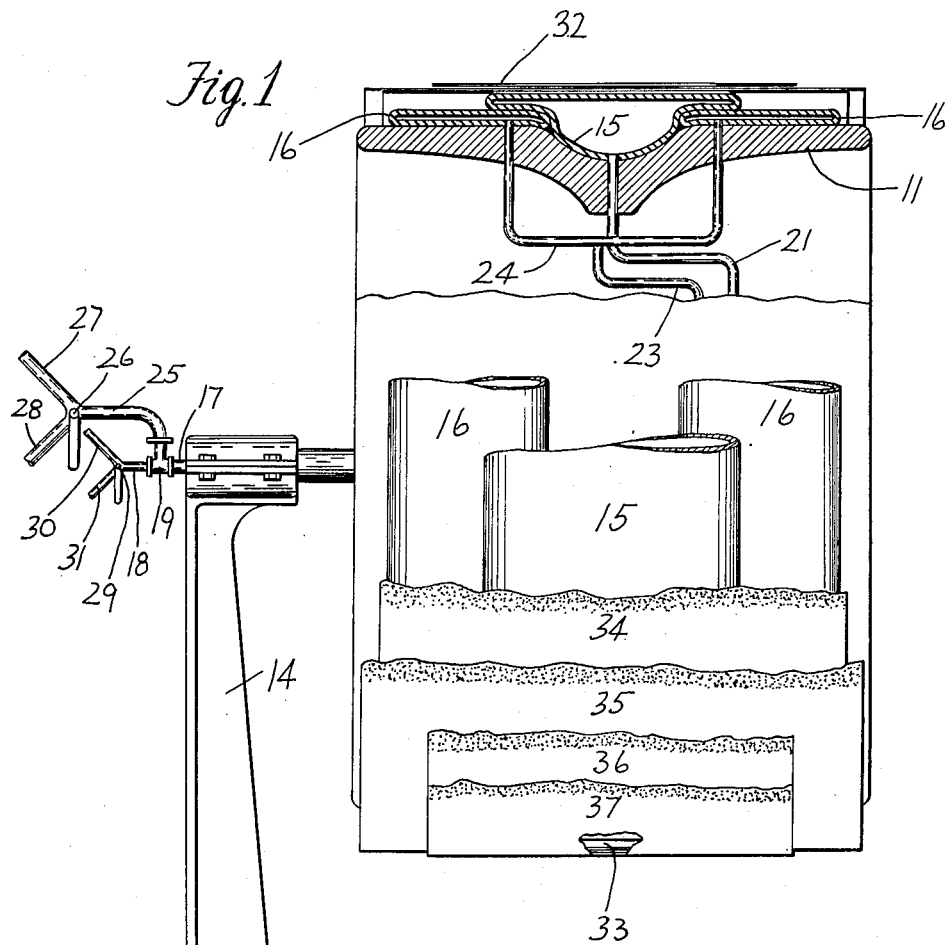
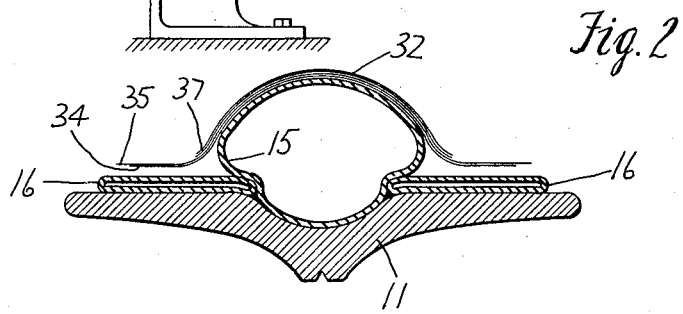
INVENTOR
David F. Logan
BY
ATTORNEY

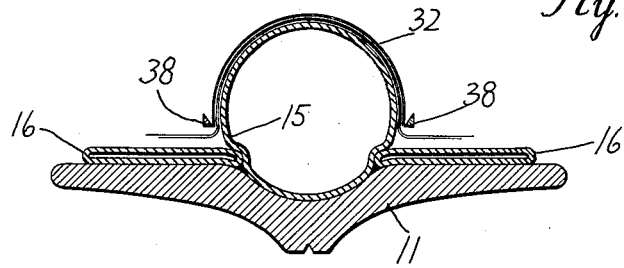
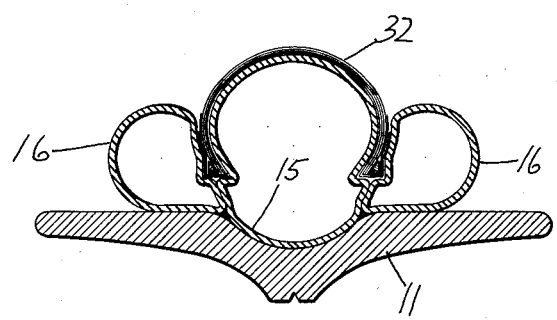
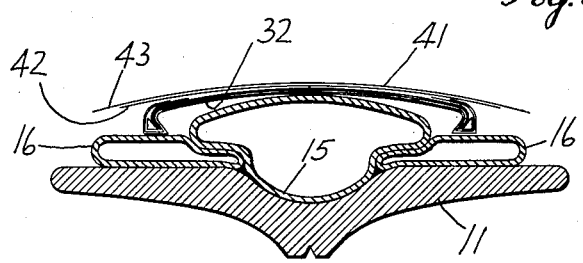
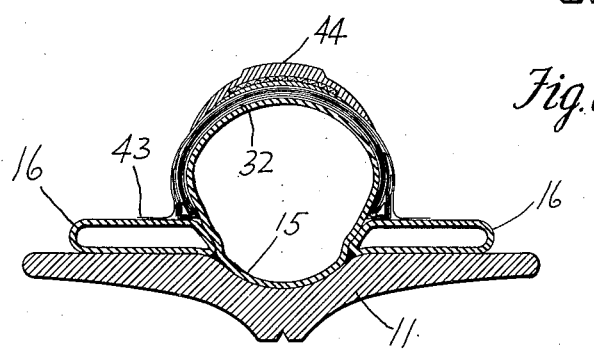

Feb. 10, 1925.
D. F. LOGAN
TIRE BUILDING
Filed July 12, 1922
1,525,455
3 Sheets-Sheet 3
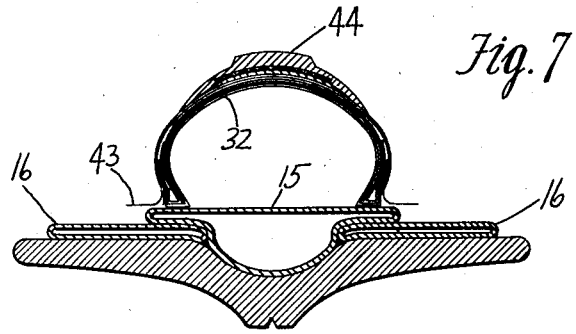
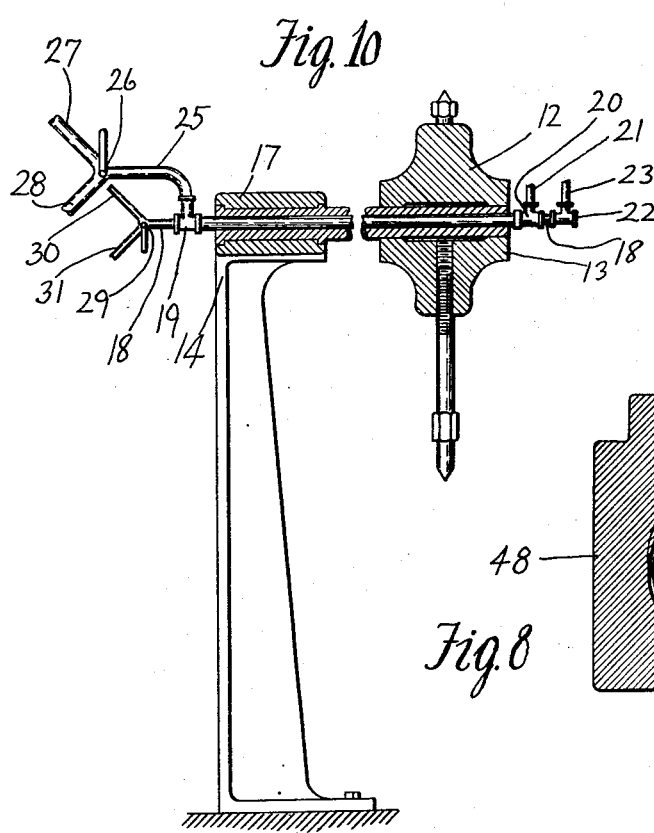
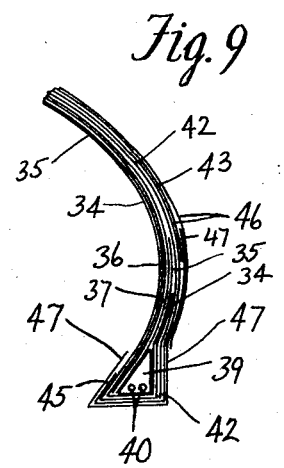
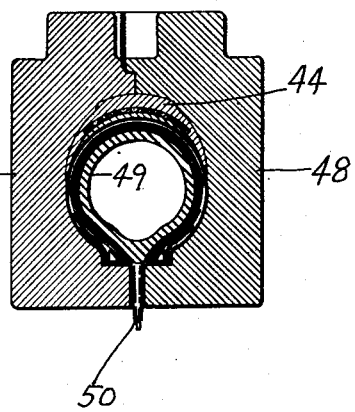
INVENTOR
David F. Logan
BY Edward C. Taylor
ATTORNEY Patented Feb. 10, 1925.

1,525,455

UNITED STATES PATENT OFFICE.

DAVID F. LOGAN, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE BUILDING.

Application filed July 12, 1922. Serial No. 574,429.

*To all whom it may concern:*

Be it known that I, DAVID F. LOGAN, a citizen of the United States of America, residing at Chicopee Falls, in the county of Hampden and State of Massachusetts, have invented certain new and useful Improvements in Tire Building, of which the following is a specification.

My invention relates to methods of and an apparatus for constructing laminated rubber articles such as the outer casings of pneumatic tires, and has for its object the improvement of prior methods and apparatus from standpoints of economy, accuracy, and rapidity.

The invention will now be described in connection with the accompanying drawings, in which—

Fig. 1 is an elevation, partly progressively broken away and partly in section, of a device upon which the tire is constructed, showing also the first stage of constructing a tire thereon according to my invention;

Figs. 2 to 7 are sectional views corresponding to a portion of Fig. 1 and illustrating successive stages in the building of the casing;

Fig. 8 is a sectional view illustrating one manner of vulcanizing the casing:

Fig. 9 is a diagrammatic section, on a larger scale than the preceding figures, of one bead portion of a built-up casing; and Fig. 10 is a detail of certain air connections.

In Fig. 1 is illustrated an apparatus embodying my invention and designed to serve as a support and former upon which a tire casing may be built. The device comprises a rim 11 supported in any convenient way, as upon a chuck 12 turning freely around a bearing 13 (Fig. 10) on a standard or buck 14. The rim 11 is channeled at its periphery to receive an annular bag 15, which may if desired be cemented or otherwise secured in place. Located on either side of this central bag, and underlying its edge portions, are bags 16. The purposes of these three bags will be set forth below.

A convenient manner of arranging the piping for controlling the inflating of the several bags is illustrated in Figs. 1 and 10. Through the top of the buck 14 and through bearing 13 is passed a pipe 17, and inside of that a second pipe 18, a suitable stuffing box 19 preventing leakage of air at one end of pipe 17 and a swivel 20 preventing leakage at the other. To swivel 20 is attached a tube 21 connecting with the central bag 15, and to a swivel 22 at the end of pipe 18 is attached a tube 23 connecting through a branch 24 with both of the side bags. Pipe 17 is connected, through stuffing box 19, with a pipe 25 having a three-way valve 26 therein by means of which it may be closed or connected to either a source of compressed air 27 or a source of suction 28. Pipe 18 is similarly connected by a three-way valve 29 by which it may receive compressed air from a pipe 30 or suction from a pipe 31 or be held closed to retain the bags in the desired state of inflation. The manner of use of this apparatus, and the method of building tire casings which I preferably employ therewith, will now be described.

To start the construction of a tire casing I preferably build a flat band 32 of a plurality of plies, four in number as shown, of slightly less than the bead circumference of the casing to be built, and position this band around the rim 11 and the various bags thereon. The rim and bags are preferably, although not necessarily, made of a sufficiently small outside diameter to permit the band 32 to be slipped thereover without stretching, and as a further preferred feature, of a sufficiently small diameter to leave a gap 33 between the bottom of the band and the bottom of bag 15 as the band hangs freely in position. This is convenient as it permits the band to center itself after its top portion has been properly located, but if desired the band may be stretched over the bags. As shown, the band is composed of four plies, two wide which serve to lock the later-applied bead filler in place by being folded around it, and two narrower plies 36 and 37 which merely come to the toe of the bead filler (Fig. 9). The material used is preferably cord fabric of the usual type, with the cords in alternate plies running in opposite directions, but other material may be substituted if desired.

Fig. 1 shows the band 32 in position upon the bags. The band may be built up directly on the bags or separately upon a drum or "flipper board." With the band in place, compressed air is admitted to the central bag 15 by turning valve 26. This causes the band to be stretched as shown by Figs. 2 and 3, the former showing an intermediate stage of expansion and the latter the band expanded to substantially the circumference it is to have in the finished tire.

The bead fillers 38, which are of the usual straight side type having triangular body portions 39 and annular wire reinforcements 40 in the bases, may be positioned when the band is in the condition of Fig. 1, but they are preferably applied after the band has been expanded so as to bring the edges of plies 36 and 37 to substantially the correct bead location. In Fig. 3 the bead fillers are shown as having been put in place, the sticky rubber with which they and the plies are coated, as is usual in tire building methods, serving to hold them in place during the succeeding operation. The operator next opens valve 29 to inflate the side bags 16, bag 15 meanwhile being held expanded by turning valve 26 to the neutral position. This inflation of the side bags turns the marginal portions of plies 34 and 35 around the bead fillers, and presses them against the expanded body of the carcass. Previous to this operation, the outer surface of the plies may be moistened with naptha to increase the stickiness of the surfaces. After the marginal portions have been pressed into place (Fig. 4) they will be firmly secured there by the adhesiveness of the rubber, and the side bags can be released, leaving the bead fillers firmly locked between the carcass plies. It may be remarked that a slight additional expansion of the central bag may occur during the expansion of the side bags, as the latter press in the sides of the central bag and force its center outwardly.

If a six ply tire is to be made, the central bag is now deflated until it is substantially flat, as shown in Fig. 5. The side bags are also deflated, with enough air preferably left in them to support the bead portions of the carcass, as also shown in that figure. The last two of the six plies are now added, being either laid up directly upon the partially formed carcass or built in the form of an endless band and slipped over the carcass. This band 41 is indicated in Fig. 5 as composed of two plies 42 and 43, ply 43 of sufficient width to pass around the bead filler as indicated in Fig. 9, and ply 42 narrower, so as to terminate at the heel of the bead. With this second band in place the carcass is again expanded by means of the central bag until it reaches a circumference substantially that which it is to assume in the finished tire. This circumference is preferably chosen for applying the tread, for reasons which will appear.

The tread rubber 44 (by which term I include such cushion rubber, breaker strips, and the like as may be desirable to apply) is shown in Fig. 6 as having been applied, and its marginal portions pressed against the carcass. This material can be applied when the carcass is deflated as in Fig. 5, or at any intermediate stage between Figs. 5 and 6, the expansion of the bag and carcass serving to press the tread firmly in place without the necessity for any stitching. As the tread material is composed almost entirely of uncured rubber, however, it will tend, if stretched (unless a considerable time interval is allowed to elapse), to return to the circumference from which the stretching started. If, for example, the tread is applied to the carcass in the position of Fig. 5 (it being understood that it will be so applied as to form an endless band adhering to the carcass throughout its circumference) the casing so built up will reassume its substantially flat shape upon release of the bag pressure unless that pressure has been sufficiently long continued to give a permanent set to the raw rubber. If the pressure is released as soon as the tread is applied, the resulting flat casing will have to be expanded and set as a separate operation before the insertion of the air bag or other equipment upon which the casing is to be vulcanized. If the pressure is continued to give a permanent set the equipment will be unproductively employed for long periods, and much larger numbers of pieces of equipment must be used than economy would dictate. By deferring the placing of the tread materials until the carcass is inflated to substantially its dome circumference, the tendency of the casing to return to its flat form is practically removed. The tread material is in this case applied so as to form an endless band of substantially unstretched rubber firmly united to the rubber of the carcass as by rolling as in the usual manner of applying treads to carcasses built on ring cores. The relatively large bulk of the rubber in the tread offers a resistance to compression offsetting the tendency to contraction in the carcass rubber, so that when the bag 15 is deflated (Fig. 7) the casing will remain in an arched cross-sectional form only slightly less in circumference than when the tread was applied.

The casing is now removed from the drum 20 and the outstanding edges of the ply 43 folded at 45 around the bead to complete the lockup. The sidewalls 46 and the chafing strips 47 may be added, and the casing thus completely built up ready for vulcanization. If desired, the sidewalls and chafing strips may be applied at the same time as the tread, the edges of the chafing strips being left free as with the edges of ply 43 and folded in after the casing is removed from the expanding bag, but the operator has a more horizontal surface to work to if the placing of the elements is deferred until the removal of the casing from the drum, and the latter method is therefore generally preferable.

The casing may be vulcanized in any desired manner, but I have shown in Fig. 8 in transverse section the casing positioned within the usual split molds 48 into which it is expanded by fluid under pressure admitted into an expansible annular bag 49 through a valve 50. The bag, which may be of the usual type, is sufficiently flexible so that it can be introduced into the casing when in the arched form shown in Fig. 7.

Having thus described my invention, I claim—

1. An apparatus adapted to form tire casing material, comprising a central annular bag adapted to expand the central portion of the material, and a bag at each side thereof adapted to act upon the side portions of the material.

2. An apparatus adapted to form tire casing material, comprising means adapted to stretch the central portion of the material, and separately actuable means adapted to act upon the side portions of the material to fold them about bead anchorages.

3. An apparatus adapted to form tire casing material, comprising an annular rim, an annular inflatable bag mounted thereon, a bag at each side of said first-named bag, and means to inflate or deflate the central and side bags independently of each other.

4. An apparatus adapted to form tire casing material, comprising an annular rim, an annular inflatable bag mounted thereon, and a bag at each side of the first-named bag having a portion underlying the edges of the first-named bag.

5. An apparatus adapted to form tire casing material from the flat, comprising an annular rim of greater width than the flat material, an annular bag centrally mounted thereon of less width than the material and adapted to operate upon the central portion of the material, and a bag at each side of the central bag adapted to operate upon the marginal portions of the material.

6. A method of building a tire casing which includes forming an endless flat band of carcass-building material of substantially the bead diameter of the casing, expanding the central portion of the band to substantially tire form, leaving the marginal portions substantially unstretched, and thereafter applying bead anchorages and folding the marginal portions of the band around them.

7. A method of building a tire casing which includes forming an endless flat band of carcass-building material of substantially the bead diameter of the casing, expanding the central portion only of the band by fluid pressure to substantially tire form, leaving the marginal portions of the band free, applying bead anchorages, and subsequently applying fluid pressure to the marginal portions of the band to fold them around the bead anchorages.

DAVID F. LOGAN.